March 3, 1964     K. HUISMAN     3,122,786
APPARATUS FOR INTERNALLY LINING PIPES
Filed Oct. 26, 1959     2 Sheets-Sheet 1
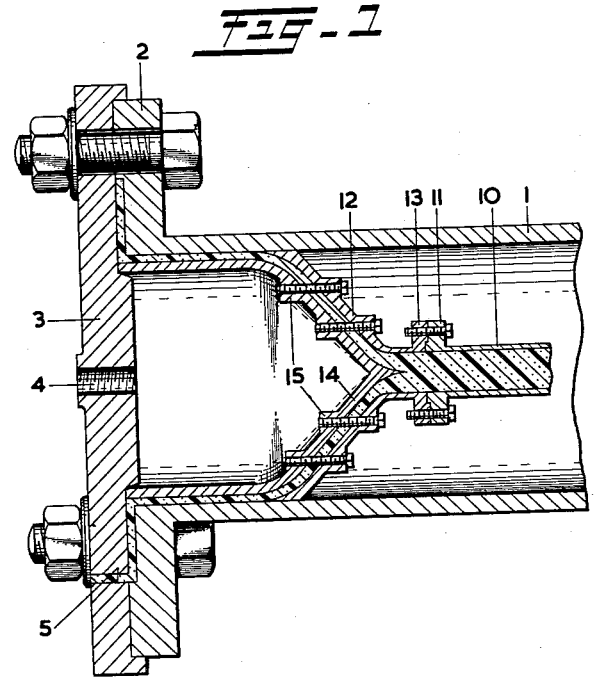
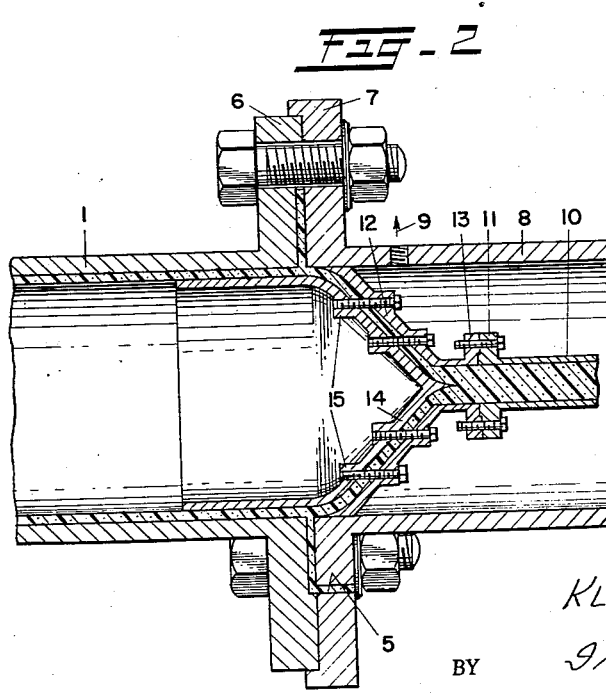
INVENTOR
KLAAS HUISMAN
BY
ATTORNEY

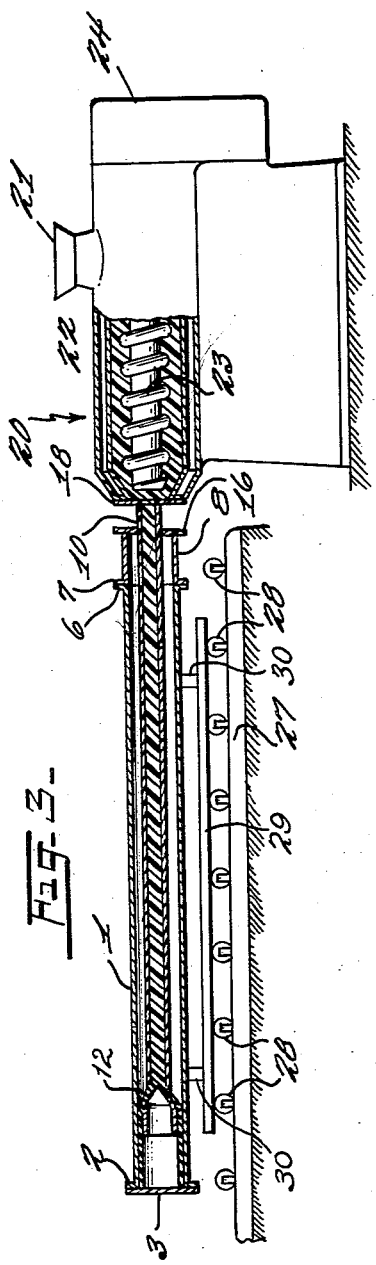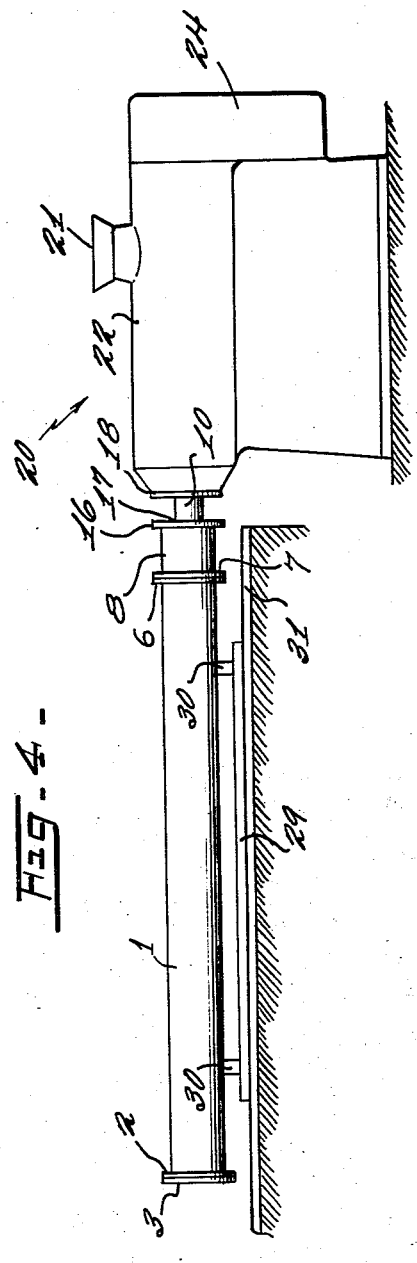

United States Patent Office 3,122,786
Patented Mar. 3, 1964

3,122,786
APPARATUS FOR INTERNALLY LINING PIPES
Klaas Huisman, Rotterdam, Netherlands, assignor to N. V. Econosto, Bureau voor Economische Stoomproductie, Rotterdam, Netherlands, a corporation of the Netherlands
Filed Oct. 26, 1959, Ser. No. 848,826
Claims priority, application Netherlands Nov. 3, 1958
1 Claim. (Cl. 18—5)

The invention relates to a method of internally lining pipes and the like with a corrosion- and/or erosion-resistant film, in particular on a rubber or plastic base.

Pipes for conveying aggressive substances, such as acids, which may cause corrosion, or liquids containing solid substances which may cause erosion, can be protected against the action of these substances by lining them internally with a film resisting the said aggression. When the pipes are fitted with flanges, the latter can be lined as well.

The process of lining pipes internally was hitherto performed by hand, the corrosion- and/or erosion-resistant film being introduced into the pipe e.g. in the form of a hose and the film being pressed against the adhesive-coated internal wall of the pipe, e.g. with the aid of compressed air and subsequently with hand-tools. Especially when the length of the pipe was considerable, this was a laborious and costly method, but above all an unreliable one, which did not produce the slightest certainty that air occlusions between the lining and the wall of the pipe were completely avoided. Owing to such occlusions of air, pipes lined by hand often exhibit areas where the lining adheres insufficiently to the wall, if at all, and in consequence of the expansion of the occluded air when the pipes grow hot the lining in many cases is seriously damaged, and as a result of said damage the internal wall of the pipe itself is exposed to the aggressive substances to be conveyed, so that the lining no longer performs its function.

The invention has for its object to remedy this, and to provide a simpler and more efficient way of obtaining the necessary relative motion between a lining material extruding nozzle and the pipe to be lined. These objects are attained according to the invention by the feature that the lining material is fed under pressure in plastic condition onto the pipe wall, via the aforementioned nozzle fitted in the pipe or the like, the outlet opening of which nozzle corresponds to the cross-section of the lining to be applied, said nozzle being adapted to be moved in the longitudinal direction relative to the pipe by the reaction force of the material leaving the nozzle.

In this way the pipe lining can be applied on the wall of the pipe without any air being occluded, while a very high degree of adhesion of the material to the wall of the pipe is obtained. Owing to the pressure, the lining material will have a very strong structure, while the surface becomes very smooth.

During the application of the film the portion of the pipe which lies in the direction of movement of the nozzle may be kept under a vacuum to promote the attainment of a perfectly air-free adhesion between the lining material and the wall of the pipe.

Into the portion of the pipe which lies opposite to the direction of movement of the nozzle a medium under pressure, such as hot or cold compressed air or steam, may be fed, which may exert additional pressure on the lining material already applied and which may at the same time subject the film already to a heat treatment for curing it during the lining process.

When the pipe or the like to be lined is fitted with flanges, the process of lining the flanges may take place in the same operation with that of lining the internal wall, so that no unevennesses occur in the place where the lining of the flange merges into the lining of the wall.

The invention will be elucidated more fully below with reference to the accompanying drawing.

FIGURE 1 is a longitudinal section of the front portion of a pipe to be lined, with an extrusion nozzle, in which in the upper half the section has been made through the axis of a flange screw and in the lower half through the axis of an exhaust passage.

FIGURE 2 is a longitudinal section of the pipe to be lined, with an auxiliary pipe fastened thereon.

FIGURE 3 is a diagrammatic side elevation, partly broken away, of the entire pipe lining apparatus, including the extrusion press and a pipe support having a set of rolls.

FIGURE 4 is another side elevation similar to FIGURE 3, but wherein the pipe support comprises a slideway.

The pipe 1 is fitted in front with a flange 2 and at the rear with a similar flange 6. On the front flange 2 a blind auxiliary flange 3 is fastened, which fits accurately on the front flange 2 and is furnished with a central connection 4 for the possible admission of a fluid, such as hot or cold compressed air or steam. The pipe flange 2 has a recessed central part, in which the lining has to be applied. Spaced around the edge of this central part, exhaust openings 5 have been provided in the blind auxiliary flange 3.

At the rear of the pipe 1 a flange 6 has been provided, with which the flange 7 of an auxiliary pipe 8 can be connected with an accurate fit. The flange 7 is also furnished with exhaust openings 5. The auxiliary or outlet pipe 8 has the same internal cross-section as the pipe 1 to be lined, and it is furnished with a suction opening 9 for connecting a suction pump thereto. The outlet pipe 8, only a part of which is shown in FIG. 2, terminates in a sealing flange 16 (FIGS. 3 and 4), which is furnished with an opening 17 through which the supply pipe 10 for the lining material passes with a vacuum-tight fit. The supply pipe 10 for the lining material is connected at the supply end with an extrusion press 20 (see FIGS. 3 and 4), which forces the lining material into the pipe 10.

In the pipe 1 an extrusion head has been placed, which is connected by the flange joint 11, 13 with the pipe 10. The extrusion head consists of an external funnel 12 fitting into the pipe to be lined and an internal funnel 14 with a closed top, the wide end of which merges into a cylindrical jacket, the external diameter of which is equal to the internal diameter of the pipe to be lined, minus twice the desired thickness of the lining. The funnels 12 and 14 are truly centered at some distance from each other, and are fastened together by means of spacing screws 15.

The lining is applied in the following way:

After some previous treatment of the surface to be lined, e.g. a sandblasting treatment and the application of adhesive on said surface, the movable extrusion head is inserted into the pipe 1 until the cylindrical part of the internal funnel 14 engages the auxiliary flange 3. Lining material is now extruded with the aid of press 20, which material expels all the occluded air and causes it to escape through the exhaust openings 5. The extrusion continues until all the air has escaped through the exhaust openings 5 and the lining material emerges through said openings. The process of lining the flange 3 is now complete and, if desired, the suction pump is now put into operation (during which the exhaust openings 5 in flange 7 have to be closed) and the air is sucked from the interior of the pipe. The extrusion head is now moved relative to the pipe 1 at a regular rate, while the lining material is regularly fed. This relative motion is obtained in a novel manner to be described hereinafter. In consequence of the design of the extrusion head the plastic lining material upon emerging from the outlet opening of the extrusion nozzle is forced to assume a form corresponding to the free space between the cylindrical part of the internal funnel and the internal wall of the pipe to be lined. If desired, a fluid such as cold or hot air or steam may be supplied through the opening 4 in the flange 3 which not only exerts additional pressure on the lining material already applied, but may also serve for the simultaneous heat treatment of the lining material. When the lining material consists of a rubber-ebonite mixture, the vulcanization accordingly can already be started during the application of the lining.

As soon as the whole pipe has been lined, the suction pump is put out of operation and the exhaust openings in the flange 7 are opened. The extrusion head is now stopped at the level of the flange joint 6, 7 while the supply of material is continued. Just as with the front flange 2, the air is expelled by the ingress of the lining material and escapes through the exhaust openings in the flange 7. As soon as the lining material emerges from the exhaust openings, the recessed part of the flange 6 is filled completely with lining material. After this, the treatment has to be continued for a moment, so that a few additional centimetres of lining are formed in the outlet pipe 8 as well. Care has to be taken that the material cannot adhere on the outlet pipe 8. After the supply of material has been stopped, first the flanges 3 and 7 are detached, the extrusion head being kept in the same position, so as to prevent the last portion of the lining from breaking at random outside the pipe 1. As soon as the flange 7 with the pipe 8 has been removed, the last portion of the lining is accessible and the superfluous part of it can be severed from the treated pipe with a knife or a saw.

It has also been found possible to operate the nozzle by the reaction force of the material leaving the outlet opening so that separate means for moving the nozzle and supply pipe 10 relative to the pipe 1 may be dispensed with. In this case the extrusion head, after pre-treatment of the surface to be lined, is inserted into the pipe 1 until it abuts against the blind auxiliary flange 3. The lining material is now delivered through the nozzle and will fill the space between the blind auxiliary flange 3 and the front flange 2. After complete filling of said space, the lining material emerges through the exhaust openings 5. These openings are then shut off or alternatively will be blocked by the curing of the material leaving the openings. Now pressure will build up in the extruded part of the lining and the reaction force will cause the blind auxiliary flange 3 to be moved away from the extrusion head. It has been found that a completely satisfactory lining can be provided by making use of said phenomenon.

In practice, the extrusion head will be mounted stationary on a supply pipe 10 which is a little longer than the pipe 1 to be lined. The latter pipe, mounted for longitudinal movement past the fixed extrusion head in response to the reaction force, is slid over the extrusion head until the blind auxiliary flange 3 abuts against the extrusion head. Subsequently, the supply of lining material is started. FIGURES 3 and 4 illustrate, by way of example only, two possible arrangements for supporting pipe 1 for longitudinal movement thereof past the stationary extrusion head at the end of supply pipe 10. FIGURE 3 shows a conventional extrusion press 20 rigidly mounted on a suitable base and connected to supply pipe 10. The extrusion press has an input hopper 21 for the lining material communicating with the interior of a cylindrical body 22. A suitable feed screw 23 located along the center axis of body 22 is rotated by conventional drive means 24 to feed the lining material through pipe 10 to the extrusion head. An elongated support platform 27 is provided at a suitable elevation, and a plurality of cylindrical rolls 28 pivoted for rotation are disposed in fixed positions along the upper surface of support 27, as shown by FIG. 3. A flat rectangular carrier 29, having a length much greater than the spacing between rolls 28, bears against a plurality of the rolls 28 for displacement transversely of their axes of rotation. A pair of cross beams 30, containing semi-circular grooves to receive pipe 1, are located near the ends of carrier 29. Pipe 1 is thus mounted by the cross beams on carrier 29 for movement longitudinally in the direction of its central axis over rolls 28. The end of supply pipe 10 remote from the extrusion head is connected with extrusion press 20 by a suitable sealed flange 18. Pipes 1 and 8 move together away from press 20 under the influence of the reaction force.

FIGURE 4 illustrates a similar arrangement, except that support platform 27 and rolls 28 are replaced simply by a suitable slideway 31, upon which carrier 29 may ride directly. The slideway 31 may be lubricated, if desired. It is clear that after the extrusion press is started in operation to feed the lining material, pipe 1 will commence moving away from the extrusion head at a uniform rate. When the end of the pipe at flange 6 just passes the extrusion head, the press 20 is stopped, and the excessive lining material is cut off from the end of the pipe.

Finally the pipe 1 can be subjected to a further treatment, e.g. a heat-treatment, for the curing (vulcanization, polymerization, condensation) of the film applied.

For the lining material a rubber-ebonite mixture is frequently used. In that case the treatment is called the "ebonization" of pipes.

What I claim is:

Apparatus for internally lining a pipe comprising an extrusion press having an outlet pipe and an extrusion head on the end of said outlet pipe, and means for slidably supporting a pipe to be lined concentrically about said outlet pipe and said extrusion head, the extrusion head comprising a funnel-shaped member, the wide end of which fits accurately within said pipe to be lined and the narrow end of which is connected to said outlet pipe, and a conical member disposed in spaced relation to said funnel-shaped member, the walls of said conical member and of said funnel-shaped member being substantially parallel, said conical member having a base, the external diameter of which is smaller than the outer diameter of said funnel-shaped member so that said funnel-shaped member and said conical member define between them an axially directed annular outlet opening for extruding therefrom a tube of lining material under extrusion pressure and in viscous condition onto the inner wall of said pipe to be lined.

References Cited in the file of this patent

UNITED STATES PATENTS

| | | |
|---|---|---|
| 39,589 | Robinson | Aug. 18, 1863 |
| 873,559 | Koontz | Dec. 10, 1907 |
| 1,582,563 | Von Haimberger et al. | Apr. 27, 1926 |
| 2,015,001 | Bishop | Sept. 17, 1935 |
| 2,098,857 | Buckingham | Nov. 9, 1937 |
| 2,194,701 | Harrison | Mar. 26, 1940 |
| 2,362,881 | Canney et al. | Nov. 14, 1944 |
| 2,685,861 | Webb | Aug. 10, 1954 |
| 2,892,444 | Perkins | June 30, 1959 |